United States Patent
Mathews et al.

(10) Patent No.: US 6,233,666 B1
(45) Date of Patent: May 15, 2001

(54) DEFERRED DISK DRIVE SPACE ALLOCATION FOR VIRTUAL MEMORY PAGES WITH MANAGEMENT OF DISK ADDRESS RECORDING IN MULTIPAGE TABLES WITHOUT EXTERNAL PROCESS INTERRUPTS FOR TABLE FOR INPUT/OUTPUT TO MEMORY

(75) Inventors: Thomas Stanley Mathews; Kumar V. Nallapati; David William Sheffield, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/156,129

(22) Filed: Sep. 17, 1998

(51) Int. Cl.⁷ .............................. G06F 12/00; G06F 12/06
(52) U.S. Cl. .......................... 711/203; 711/206; 711/207; 711/111
(58) Field of Search .................................. 711/203, 207, 711/206, 204

(56) References Cited

U.S. PATENT DOCUMENTS

| 5,699,539 | * | 12/1997 | Garber et al. | 711/2 |
| 5,784,707 | * | 7/1998 | Khalidi et al. | 711/206 |
| 5,835,964 | * | 11/1998 | Draves et al. | 711/207 |
| 5,895,501 | * | 4/1999 | Smith | 711/207 |

* cited by examiner

Primary Examiner—Tuan V. Thai
(74) Attorney, Agent, or Firm—Volel Emile; J. B. Kraft

(57) ABSTRACT

A data processor controlled system for providing virtual memory comprising a data processor memory for storing a plurality of real memory pages, secondary storage unit and a memory management control unit for moving the real memory pages into and out of the secondary storage unit wherein each real memory page is respectively stored as a virtual memory page. The invention provides a system and method for deferred allocation of space for a real memory page in the secondary storage unit for recording the address of the space in a table having a plurality of table pages for recording the secondary storage addresses of each of said virtual memory pages. The system includes control unit responsive to the moving of a memory page into the secondary storage, and determining whether the initial table page for recording the address of the moved page is present in the data processor memory, the control unit further responsive to the determining unit for moving, without any external process interrupts, the initial table page into the data processor memory if the initial table page is not present, and the recording unit for recording the address of the moved page into the initial page.

9 Claims, 5 Drawing Sheets

DEFERRED DISK DRIVE SPACE ALLOCATION FOR VIRTUAL MEMORY PAGES WITH MANAGEMENT OF DISK ADDRESS RECORDING IN MULTIPAGE TABLES WITHOUT EXTERNAL PROCESS INTERRUPTS FOR TABLE FOR INPUT/OUTPUT TO MEMORY

TECHNICAL FIELD

The present invention is directed to page memory used to implement virtual memory in which the computer's disk drive storage device functions as an extension of the computer system's main memory (RAM). More particularly, it is concerned with the deferred allocation of space in the disk drive until pages in RAM are ready to be transferred to the disk drive.

BACKGROUND OF THE INVENTION

As computer operations increase in complexity and with the rapidly increasing demands on computer systems for graphics and image processing, there is an increasing demand for computer memory. At present, although main computer memory hardware supports in the order of hundreds of Mbytes, most present computer architectures are well beyond supporting 4 Gbytes of real storage. Through virtual memory the main memory (RAM) of the computer is expanded via its secondary storage, e.g. disk drive, so as to transparently appear to have several Gbytes of available memory. In such virtual memory systems the location of data is specified on a page of a memory page table rather than by the physical location of the data. This makes it possible to store memory pages wherever memory space on the disk drive becomes available. Access to memory is performed using these segments or pages which are 4 Kbytes in size. Each page is assigned a number or an address. In present virtual memory systems, it is possible to load more programs into the memory system than actually fit. At one time, only a portion of a given program may actually be used; the rest of it is dormant. Such dormant program routines do not have to be in the system's real memory until actually used. Virtual memory systems write out the pages of the dormant routines to the disk drive where the pages may be stored until needed. This writing out is referred to as paging out. Then as long as a page is not modified, it need be paged out only once irrespective of the number of times it is paged back into real memory. Of course, if the page is modified, it must again be paged out to disk drive storage. On the other hand, when the operating system detects that a portion of a program not currently in real memory is needed, known as a page fault, the result is that the pages needed will be paged into real memory. The page being paged into memory is accessed by means of the virtual address of its space on the disk drive. The operating system must translate this virtual address into the address where the page is loaded. This is performed by means of page tables. Since these page tables increase in size with the increase in size of virtual memory, page tables have become very large.

Because the management of virtual memory operations has increased its demand upon operating system resources, i.e. operating system overhead, there has been a trend in many virtual memory management systems to defer the allocation of disk drive storage space, i.e. a paging disk page block for a virtual page until that particular page is actually removed or paged out from the real memory of the computer system into the disk drive. This amounts to a significant savings in overhead since the tracking path lengths in databases are unnecessary for pages not paged out of memory.

However, such deferred allocation has encountered performance penalties when paging out of memory is finally necessary. At this point not only must a paging space disk block in the secondary storage means, e.g. disk drive must be allocated, but the address of this disk block must be saved in a page table such as an External Page Table (XTP) so that the page may be paged back into the real or basic computer memory when needed, i.e. responsive to a page fault. However, as set forth above, page tables have so greatly increased in size, and often the addresses for particular virtual pages contain references to more than one table page. Page tables generally are indirectly referenced as pageable structures and, as such, may require more than one page to find the proper places in the table to store the newly allocated disk block addresses. This requires many table pages to be paged into and out of the real or basic computer memory in order that the operating system kernel (base operating system), which controls the pageins and pageouts of memory pages between the memory and disk drive, properly record the addresses of virtual pages in the page tables.

Existing systems using deferred allocation of disk drive space, all also use external processes separate and independent of the base operating system or kernel to drive the pageins of table pages to the computer memory in the event of table page faults, i.e. a table page needed for the recording of the virtual address of an allocated real memory page is not in the computer memory (RAM). In such instances the separate table process is called (awakened); it points to a table page which paged into memory. At this point, based upon operating system efficiency protocols, the separate table process is interrupted (put to sleep) while the table page is processed. Such processing may require the input of up to several referenced subsequent table pages into memory requiring several corresponding awakenings and interrupts for the table process before the number of table pages sufficient to record the address of an allocated page is completed. This implementation of deferred allocation has been found to require the handling of queues of pageouts for the address table pages required, as well as significant context management for interrupts as the separate or external process for table page driving is put to sleep and subsequently awakened. This complexity in the handling of the address table pages makes this system substantially nonscalable, i.e. the computer system may not be readily expanded to add other components, particularly additional processors in multiprocessing computer environments.

SUMMARY OF THE INVENTION

The present invention overcomes these prior art problems in deferred allocation of space in disk drives until memory pages are to be out paged to the disk drive. It does so through a system which eliminates the use of a separate or external process for driving the pageins of table pages to real memory during the recording of the addresses of allocated spaces. Thus, the need for sequences of table page process awakenings and process interrupts is eliminated, as well as the attendant management of table pageout queues.

Briefly stated, the present invention is directed to a data processor controlled system for providing virtual memory comprising a data processor memory storing a plurality of real memory pages, secondary storage means and means for moving said real memory pages into and out of said secondary storage means, wherein each real memory page is respectively stored as a virtual memory page. The invention provides a system and method for deferred allocation of space for a real memory pagein the secondary storage means for recording the address of the space in a table having a plurality of table pages for recording the secondary storage addresses of each of said virtual memory pages. The system includes means responsive to the moving of a memory page into the secondary storage for determining whether the initial table page for recording said address of moved pages is present in said data processor memory. It further has means responsive to said determining means for moving, without any separate or external process interrupts, the initial table page into said data processor memory if said initial table page is not present, and means for recording said address of said moved page into said initial table page.

Since the address table is likely to be indirectly referenced and, thus, may have to access more than that one page to complete the address recording, the system may also include means for determining from the initial table page whether a subsequent table page is required for recording said address of said moved page, and means, responsive to a determination that a subsequent table page is required, for providing, without any interrupts for a separate or external process, the subsequent table pagein said data processor memory.

The system and process of the invention are preferably carried out completely within the operating kernel (base operating system). In the operation of the kernel, in recording the address of the disk drive space of the allocated memory page, there is a simple check as to whether the initial page required in the address table is already in memory, and if not, then a pagein is driven from the kernel to obtain this address table page.

DETAILED DESCRIPTION OF THE PREFERRED EMBODIMENT

Figure 1:
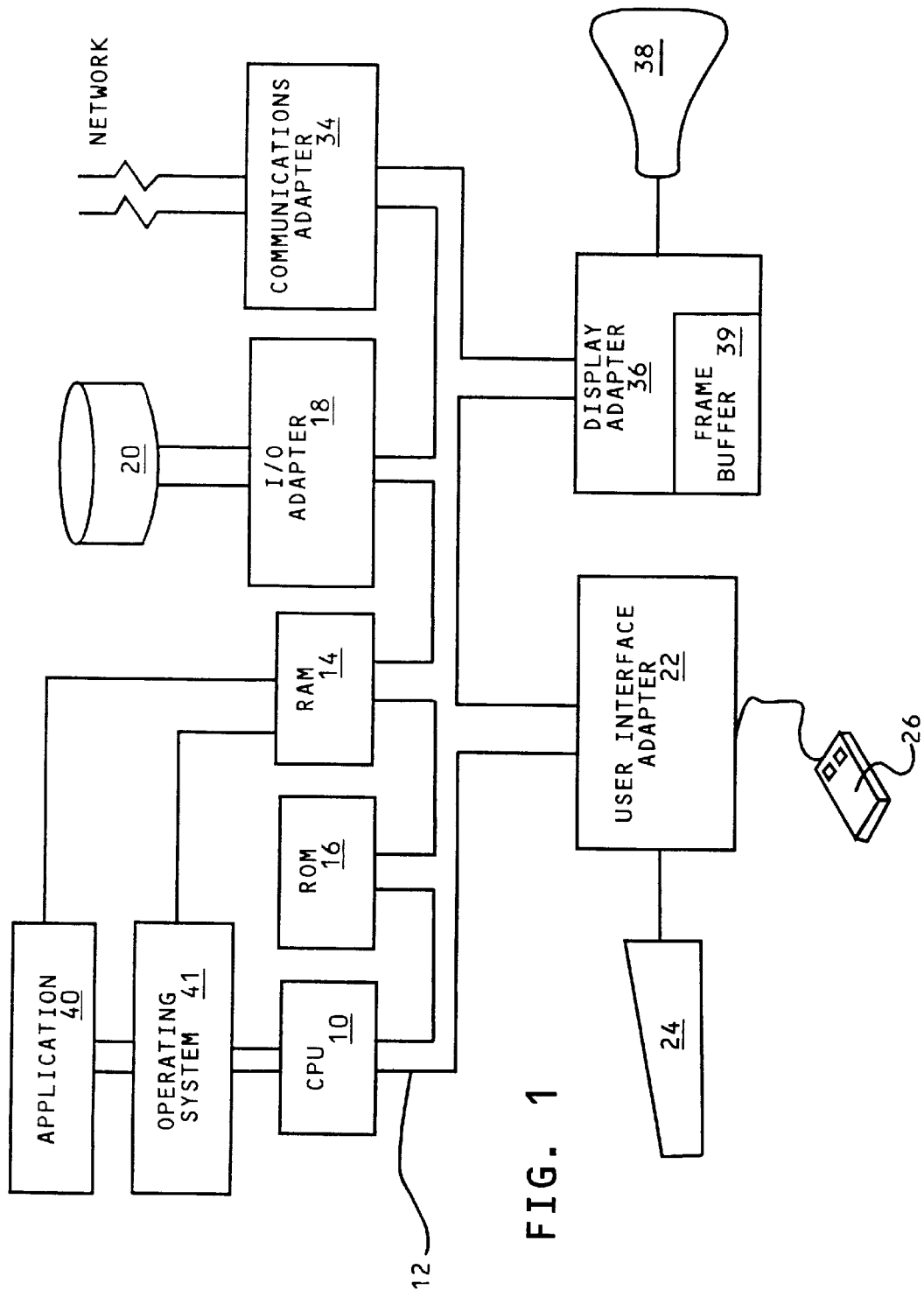
FIG. 1 is a block diagram of a generalized data processing system including a central processing unit in which the virtual memory management system of the present invention may be implemented.

Referring to FIG. 1, a typical data processing system is shown which may function as a basic computer controlled system used in implementing the present invention of managing address recording in paged address tables after deferred allocation of memory pages into disk drive. A central processing unit (CPU) 10, such as one of the PC microprocessors or workstations, e.g. RISC System/6000 (RS/6000) series available from International Business Machines Corporation (IBM), is provided and interconnected to various other components by system bus 12. An operating system 41 runs on CPU 10, provides control and is used to coordinate the function of the various components of FIG. 1. Operating system 41 may be one of the commercially available operating systems such as the AIX 6000(™) operating system or OS/2(™) operating system available from IBM (AIX 6000 and OS/2 are trademarks of International Business Machines Corporation); Microsoft's Windows 95(™) or Windows NT(™), as well as UNIX and AIX operating systems. Application programs 40 controlled by the system are moved into and out of the main memory RAM 14 and consequently into and out of secondary storage, disk drive 20, in a manner to be subsequently described in greater detail. A read only memory (ROM) 16 is connected to CPU 10 via bus 12 and includes the basic input/output system (BIOS) that controls the basic computer functions. Random access memory (RAM) 14, I/O adapter 18 and communications adapter 34 are also interconnected to system bus 12. I/O adapter 18 may be a small computer system interface (SCSI) adapter that communicates with the disk storage device 20. Communications adapter 34 interconnects bus 12 with an outside network enabling the data processing system to communicate with other such systems over a local area network (LAN) or wide area network (WAN), which includes, of course, the Internet. I/O devices are also connected to system bus 12 via user interface adapter 22 and display adapter 36. Keyboard 24 and mouse 26 are all interconnected to bus 12 through user interface adapter 22. It is through such input devices that the user may interactively relate to the programs of which the memory pages are being managed by the present invention. Display adapter 36 includes a frame buffer 39, which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24 or mouse 26 and receiving output information from the system via display 38.

Figure 2:
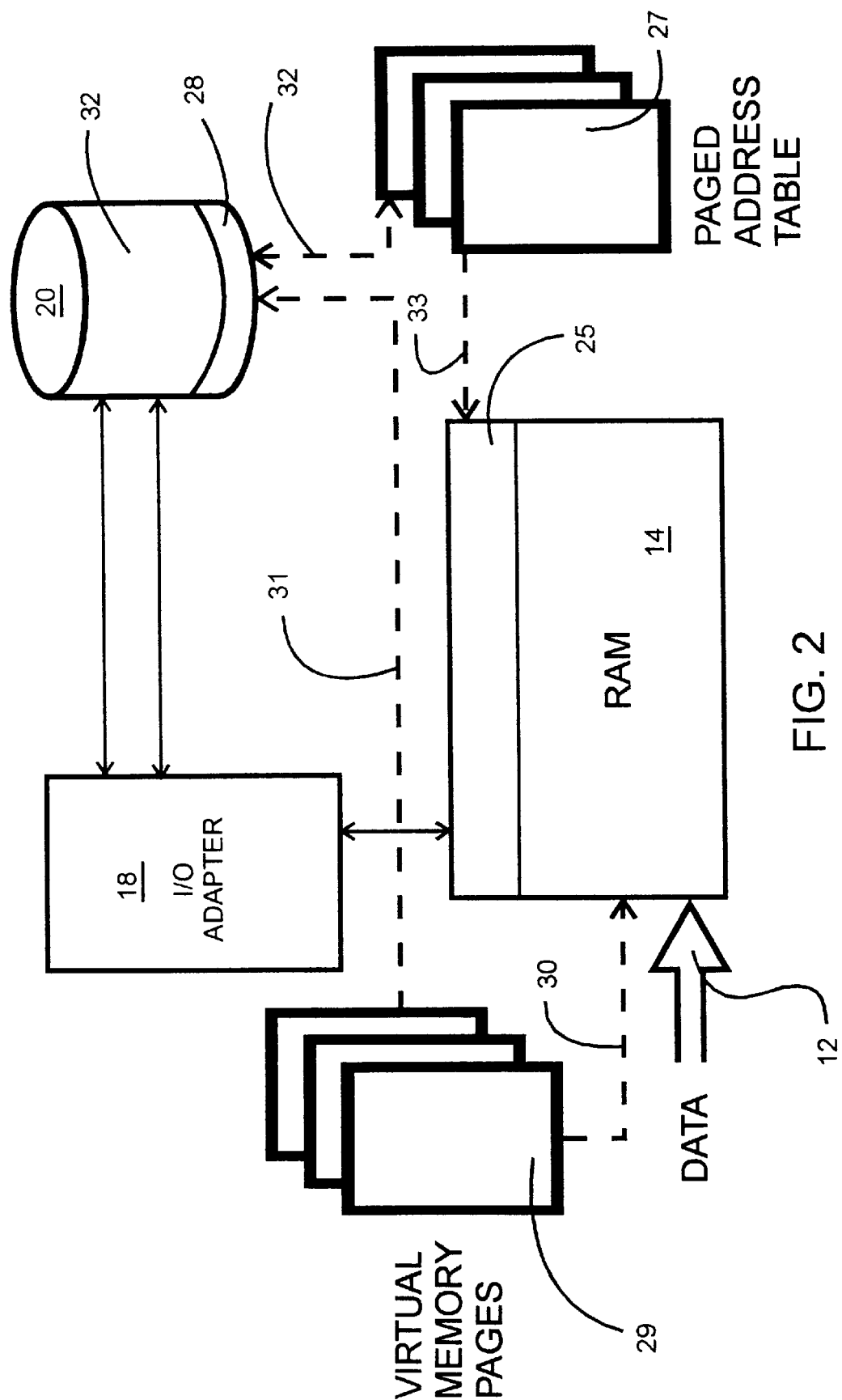
FIG. 2 is a block diagram of a portion of the system of FIG. 1 showing a generalized expanded view of the system components involved in the implementation.

Now with respect to FIG. 2, we will describe the general system components involved in implementing the invention. As mentioned above, in the memory management system of the present invention, the kernel of the operating system controls virtual memory page handling. Let us assume that selected programs are active in the system. The virtual memory pages of data (4 Kbytes per page) required to run the active programs by virtual memory page bank 29, which is actually stored divided between RAM 14 as real memory pages and in sections 32 of disk drive 20 in page sized disk space blocks. This division of the pages in the virtual memory page bank between the RAM and the disk drive is represented by dotted lines 30 and 31. The pages are paged into RAM 14 when needed and paged out of RAM when no longer needed and RAM memory space is required for other pages. The movement of memory pages into and out of RAM 14 and, thus, into and out of disk drive allocated space 32 is controlled by operating system 41, FIG. 1, and particularly the kernel of the operating system, i.e. that portion of the operating system which controls base operations and substantially resides permanently in a portion of RAM, designated section 25, FIG. 2, when the operating system is active. Thus, in the deferred allocation of disk drive space and address recording processes to be subsequently described with respect to FIG. 3, and particularly FIGS. 4 and 5, it should be understood that such processes are being conducted under the control the operating system kernel. In this connection, the multipaged address table, as represented by table 27, is also shown to be stored divided between RAM 14 and disk drive 20 as represented by dotted lines 32 and 33. The pages of the address table 27 are stored in a portion of disk drive 20 as represented by section 28. Like the application program pages, the pages of address tables are paged into RAM 14 when needed and paged out of RAM when no longer needed, and RAM memory space is required for other pages. The movement of address table pages into and out of RAM 14 and, thus, into and out of disk drive allocated space 28, is controlled by operating system 41, FIG. 1, and particularly by the kernel stored in RAM section 25. The movement of table pages or program memory pages back and forth from RAM 14 to disk drive 20 proceeds through disk drive I/O adapter 18.

Figure 3:
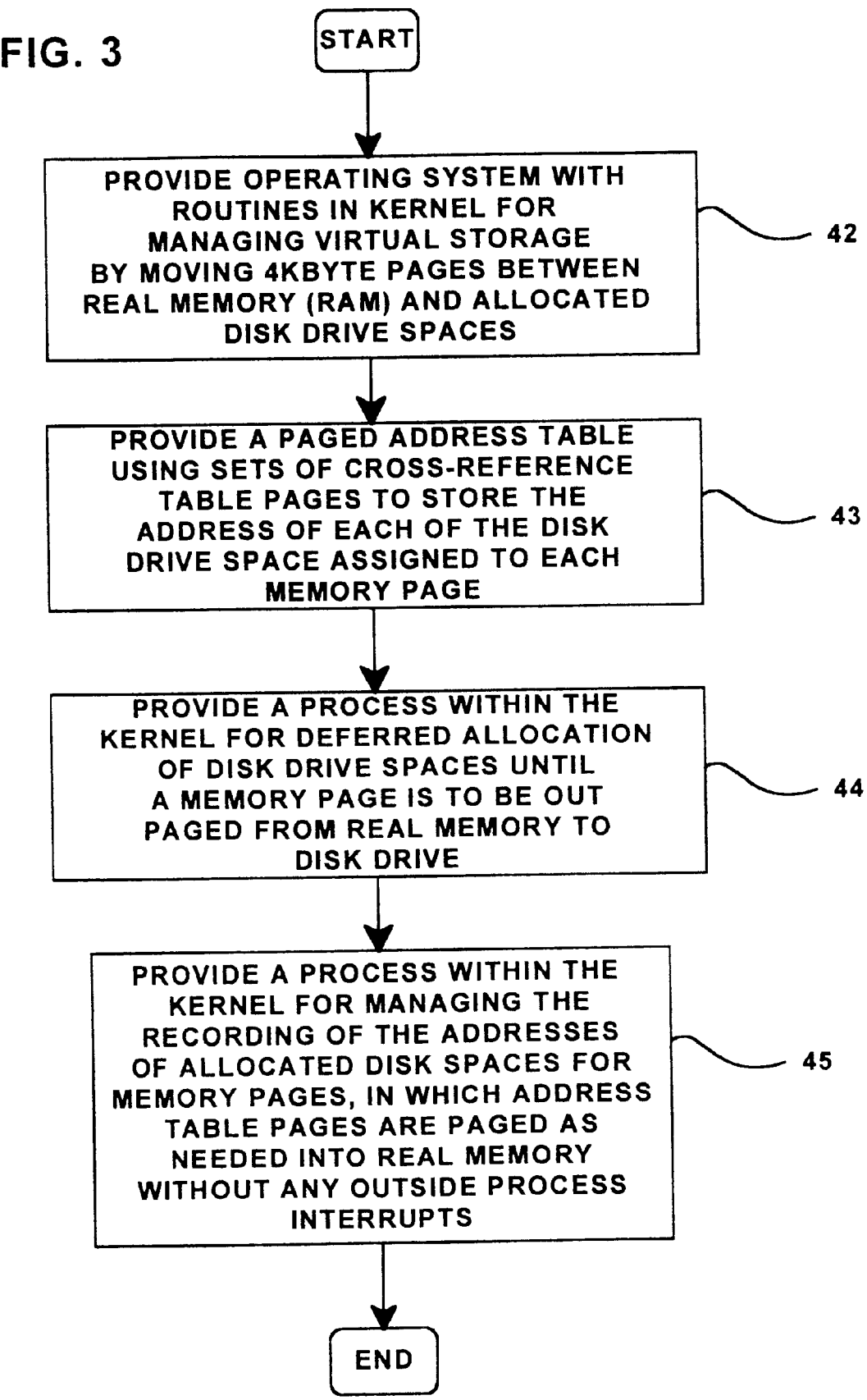
FIG. 3 is a flowchart of the basic elements of the system and program in a computer controlled system for creating and using the deferred allocation virtual memory management system of the present invention.
Figure 4:
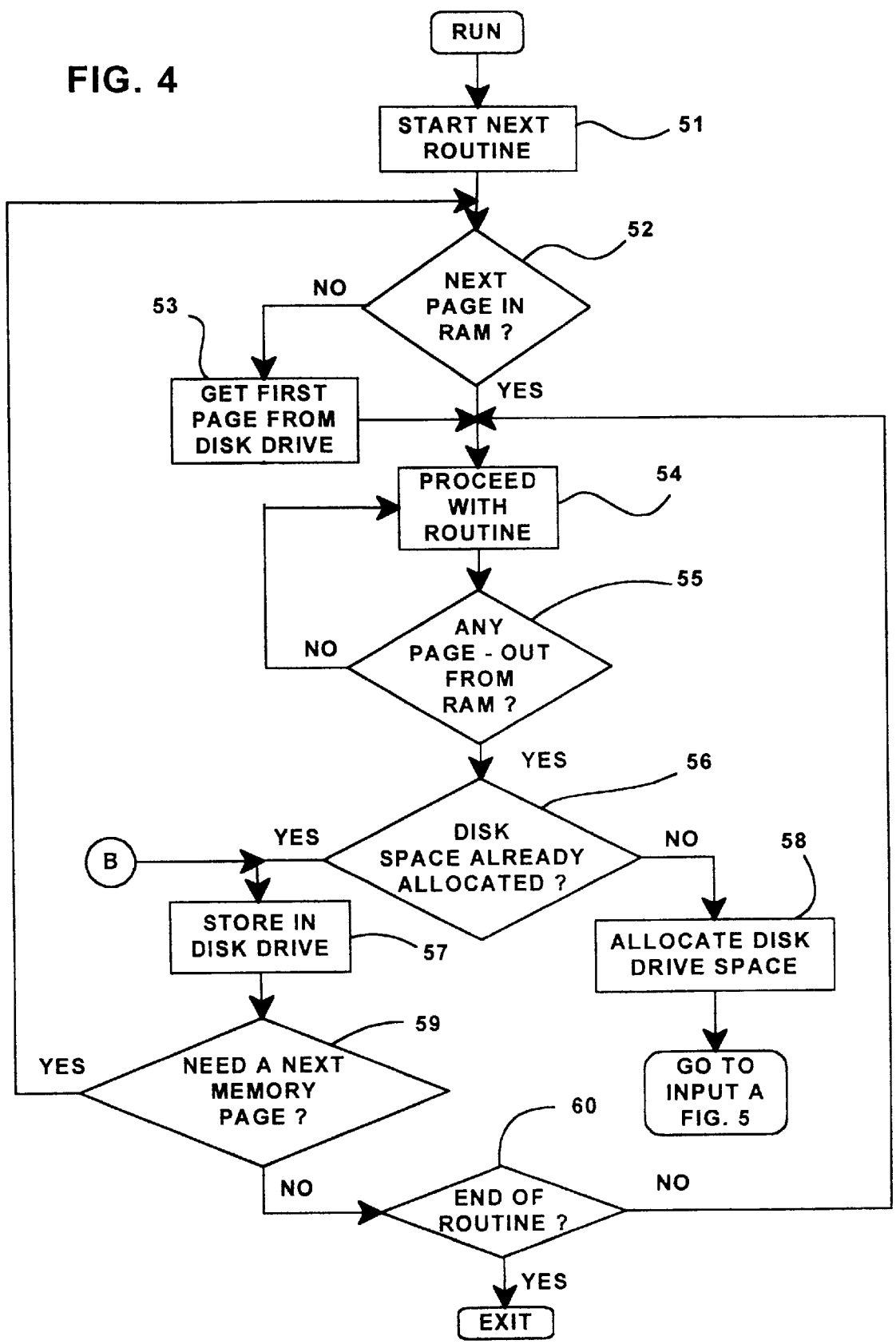
FIG. 4 is a flowchart of the steps involved in running the program set up in FIG. 3 for deferred allocation of disk drive space in virtual memory management.
Figure 5:
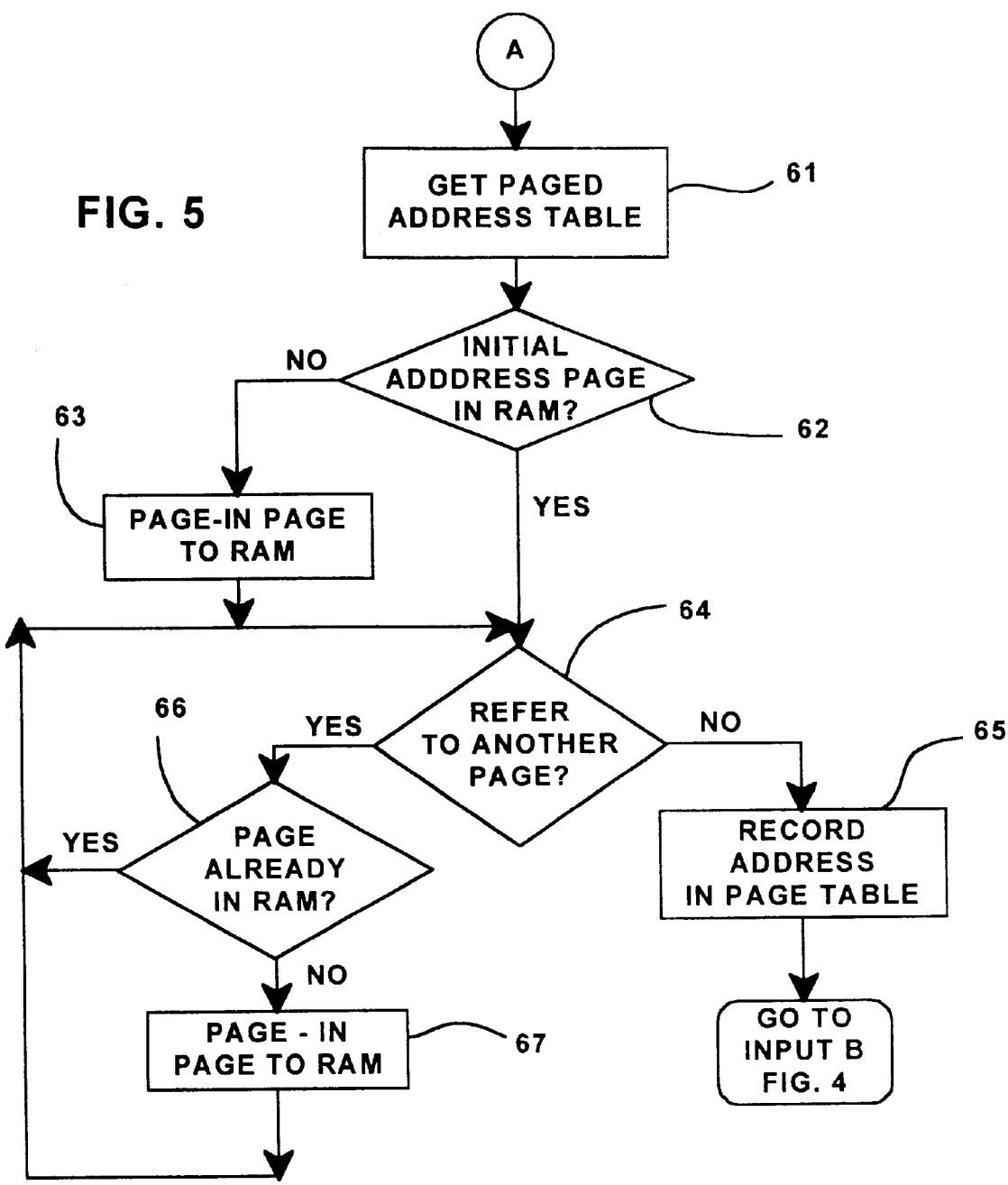
FIG. 5 is flowchart of the steps involved in processing address tables for the recording of the deferred allocation space addresses resulting from the program of FIG. 4.

Now with reference to FIGS. 3, 4 and 5 we will describe a process implemented by the present invention in conjunction with the flowcharts of these figures. FIG. 3 is a flowchart showing the setting up, in an operating system, of the process of deferred allocation and address recording of disk drive space in accordance with this invention. Step 42, an operating system is provided with kernel routines for managing virtual storage through the movement of 4 Kbyte pages between real memory in RAM and spaces allocated in disk drive. There is also provided, step 43, a paged address table which has multipages required in order to record the disk drive space for each memory page. Then, there is provided within the kernel of the operating system, a process for deferred allocation of space in the disk drive for real memory pages until such memory pages are actually paged out from real memory to the disk drive, step 44. Lastly, step 45, there is provided a process within the kernel for managing the recording of the addresses of allocated disk spaces for memory pages in which address table pages are paged as needed into real memory without any interrupts for separate outside processes.

Now with respect to FIGS. 4 and 5, there will be described a simple illustrative process for handling disk space address recordation in multipaged address tables in systems where disk space is not allocated but deferred until a real memory page is to be paged out of real memory. In the running of the process, the program routine which is to be run by the system is started, step 51. This will, of course, require several pages of data to be in real memory. In the running, when a particular page is needed, a determination is made as to whether that page is already a real memory pagein RAM. If Yes, then the routine proceeds with, step 54, but if No, then we have a fault and the kernel operation proceeds to get that page from disk drive, and the current routine is continued, step 54. At any appropriate point in the routine, a determination is made as to whether there has to be a pageout from RAM, decision step 55. If No, then the process proceeds with the current routine as indicated by the return of the flow to step 54. However, if the determination is Yes from step 55, then a further determination is made in decision step 56 as to whether disk space for the page being paged out has already been allocated. This would be the case if the page had already been in the disk drive storage and was subsequently paged into RAM. In such a case, the page merely has to be returned to disk drive, step 57, to its allocated space for which an address is already recorded. On the other hand, if the pagein RAM has not been previously allocated a disk drive space, then the deferred allocation to such a disk drive must be made, step 58, after which the address must be recorded in the paged address tables for which the process branches to entry point "A" in FIG. 5.

At this point, the paged address table is accessed, step 61, by the operating system kernel which is controlling the address recording, and the initial page for address recording is located. A determination is made, decision step 62, as to whether the initial address page for the particular address being entered is already in RAM. In this connection it should be noted that in conventional disk drive space address recording when a page from the address table is moved into RAM, it usually will remain in RAM even after address recording and until it is paged out as a result of RAM space being needed for other processing. Thus, if the address page is not already in RAM, we have a fault and the kernel operation proceeds to get that page from disk drive and pages it into RAM, step 63, without the interrupts which would be needed if this were done by a separate process. Then, or if there has been a Yes decision from step 62, a determination is made, decision step 64, as to whether the initial address table page has referenced another page. If Yes, then a determination is now made, step 66, as to whether the referenced address page is already in RAM. If the referenced address page is not already in RAM we again have a fault, and the kernel operation proceeds to get that page from disk drive and pages it into RAM, step 67, without the interrupts which would be needed, here again, if this were done by a separate process. Then, or if there has been a Yes decision from step 66, the flow is branched back to decision step 64 where a determination is again made as to whether the referenced address table page has referenced another page. If Yes, then the process again goes through previously described steps 66 and 67. This continues until the last address page does not reference an additional address page and the decision from step 64 is, thus, No. At this point, step 65, the address is recorded in the address table and the process returns to input "B" in FIG. 4 where, step 57, the memory page is paged out of RAM and stored at its allocated space in the disk drive. Then, step 59, a determination is made as to whether the active routine being processed requires another memory page. If Yes, the process is branched back to decision step 52 and the above-described process is continued from that step. If the decision from step 59 is No, then a determination is made, decision step 60, as to whether the routine being processed is at an end. If No, then the process is returned to step 54 and processing is continued from that point. If the decision from step 60 is Yes, then the routine is at an end and it is exited.

One of the preferred implementations of the present invention is as a routine in an operating system made up of programming steps or instructions resident in RAM 14, FIG. 1, during computer operations. Until required by the computer system, the program instructions may be stored in another readable medium, e.g. in disk drive 20, or in a removable memory such as an optical disk for use in a CD-ROM computer input or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In a data processor having an operating system for providing virtual memory comprising a data processor memory for storing a plurality of real memory pages, secondary storage means and means for moving said real memory pages into and out of said secondary storage means wherein each real memory page is respectively stored as a virtual memory page, a system for deferred allocation of space for a real memory page in said secondary storage means comprising:

table means having a plurality of table pages for recording the secondary storage addresses of each of said virtual memory pages, and a kernel in said operating system comprising:

means responsive to the moving of a memory page into said secondary storage for determining whether the initial table page for recording said address of said moved page is present in said data processor memory, means, responsive to said determining means for moving, without an interrupt for processing outside of said kernel, said initial table page into said data processor memory if said initial table page is not present, and means for recording said address of said moved page into said initial table page;

means for determining from said initial table page whether a subsequent table page is required for recording said address of said moved page, and means, responsive to a determination that a subsequent table page is required for providing, without an interrupt for processing of said kernel, said subsequent table page in said data processor memory.

2. The system for providing virtual memory of claim 1 wherein said subsequent table page is provided by moving it into said data processor memory from said secondary storage.

3. The system of claim 1 wherein said secondary storage means are disk drive storage means.

4. In a data processor having an operating system for providing virtual memory comprising a data processor memory for storing a plurality of real memory pages, secondary storage means and means for moving said real memory pages into and out of said secondary storage means wherein each real memory page is respectively stored as a virtual memory page, a method for deterred allocation of space for a real memory page in said secondary storage means comprising:

providing a table having a plurality of table pages for recording the secondary storage addresses of each of said virtual memory pages, and providing, in a kernel of said operating system, steps including:

determining, in response to the moving of a memory page into said secondary storage, whether the initial table page for recording said address of said moved page is present in said data processor memory, moving, without an interrupt for processing outside of said kernel, said initial table page into said data processor memory in response to a determination that the initial table page is not present, and recording said address of said moved page into said initial table page;

determining from said initial table page whether a subsequent table page is required for recording said address of said moved page, and providing, without an interrupt for processing outside of said kernel, said subsequent table page in said data processor memory in response to a determination that a subsequent table page is required.

5. The method of claim 4 wherein said subsequent table page is provided by moving it into said data processor memory from said secondary storage.

6. The method of claim 4 wherein said secondary storage is disk drive storage.

7. A computer program having program code included on a computer readable medium for deferred allocation of space for a real memory page in secondary storage means in a data processor having an operating system for providing virtual memory including a data processor memory for storing a plurality of real memory pages, secondary storage means and means for moving said real memory pages into and out of said secondary storage means wherein each real memory page is respectively stored as a virtual memory page, said program comprising:

table means having a plurality of table pages for recording the secondary storage addresses of each of said virtual memory pages, and programming means in a kernel of said operating system comprising:

means responsive to the moving of a memory page into said secondary storage for determining whether the initial table page for recording said address of said moved page is present in said data processor memory, means responsive to said determining means for moving, without an external process interrupt, said initial table page into said data processor memory if said initial table page is not present, and means for recording said address of said moved page into said initial table page;

means for determining from said initial table page whether a subsequent table page is required for recording said address of said moved page, and means, responsive to a determination that a subsequent table page is required, for providing, without an external process interrupt, said subsequent table page in said data processor memory.

8. The computer program of claim 7 wherein said subsequent table page is provided by moving it into said data processor memory from said secondary storage.

9. The computer program of claim 7 wherein said secondary storage means are disk drive storage means.

* * * * *

UNITED STATES PATENT AND TRADEMARK OFFICE
CERTIFICATE OF CORRECTION

PATENT NO. : 6,233,666 B1  
DATED : May 15, 2001  
INVENTOR(S) : Mathews, et al.

It is certified that error appears in the above-identified patent and that said Letters Patent is hereby corrected as shown below:

<u>Column 7, claim 1,</u>  
Line 29, after "processing" insert -- outside --.

Signed and Sealed this

Fifth Day of March, 2002

Attest:

Attesting Officer

JAMES E. ROGAN  
*Director of the United States Patent and Trademark Office*